(12) United States Patent
Peterson et al.

(10) Patent No.: US 11,501,016 B1
(45) Date of Patent: Nov. 15, 2022

(54) DIGITAL PASSWORD PROTECTION

(71) Applicant: LENOVO (Singapore) PTE. LTD., New Tech Park (SG)

(72) Inventors: Nathan J Peterson, Oxford, NC (US); Russell Speight VanBlon, Raleigh, NC (US); John Carl Mese, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 393 days.

(21) Appl. No.: 16/529,969

(22) Filed: Aug. 2, 2019

(51) Int. Cl.
*G06F 21/00* (2013.01)
*G06F 21/62* (2013.01)
*G06F 21/60* (2013.01)

(52) U.S. Cl.
CPC ........ *G06F 21/6245* (2013.01); *G06F 21/602* (2013.01); *G06F 2221/2143* (2013.01)

(58) Field of Classification Search
CPC ............... G06F 21/6245; G06F 21/602; G06F 2221/2143
See application file for complete search history.

(56) References Cited

U.S. PATENT DOCUMENTS

| | | | |
|---|---|---|---|
| 9,672,366 B1* | 6/2017 | Khetawat | G06F 21/6245 |
| 10,114,960 B1* | 10/2018 | McClintock | G06F 21/62 |
| 10,438,437 B1* | 10/2019 | Herrington | H04W 4/80 |
| 2007/0074133 A1* | 3/2007 | Hara | G06F 3/0481 |
| | | | 715/853 |
| 2009/0158441 A1* | 6/2009 | Mohler | G06F 21/552 |
| | | | 726/27 |
| 2014/0149330 A1* | 5/2014 | Kaplan | G06N 5/022 |
| | | | 706/46 |
| 2014/0150108 A1* | 5/2014 | Low | G06F 21/60 |
| | | | 726/26 |
| 2014/0304839 A1* | 10/2014 | Hansen | G06F 21/6209 |
| | | | 726/29 |
| 2017/0154188 A1* | 6/2017 | Meier | G06F 21/552 |
| 2018/0248698 A1* | 8/2018 | Komin | G06F 21/45 |
| 2019/0065701 A1* | 2/2019 | Yadav | G06F 21/602 |
| 2019/0114049 A1* | 4/2019 | Liu | G06F 3/04842 |
| 2019/0303596 A1* | 10/2019 | Du | G06F 9/543 |
| 2020/0257576 A1* | 8/2020 | Gallagher | G06F 40/174 |

* cited by examiner

*Primary Examiner* — Shin-Hon (Eric) Chen
(74) *Attorney, Agent, or Firm* — Kunzler Bean & Adamson

(57) ABSTRACT

Apparatuses, methods, systems, and program products are disclosed for digital password protection. An apparatus includes a processor and a memory that stores code executable by the processor. The memory stores code executable by the processor to monitor a volatile data storage area for data written to and read from the volatile data storage area. The memory stores code executable by the processor to, in response to data being one of written to and read from the volatile data storage area, analyze the data to identify a potential password. The memory stores code executable by the processor to perform one or more actions for protecting the identified potential password prior to the potential password being one of written to and read from the volatile data storage area.

15 Claims, 6 Drawing Sheets

DIGITAL PASSWORD PROTECTION

FIELD

The subject matter disclosed herein relates to digital passwords, and more particularly relates to protecting passwords during copy and/or paste operations.

BACKGROUND

Copy and paste operations are convenient for allowing a user to copy data from one location and paste the copy of the data in a different location. Users may have passwords that are difficult to memorize or remember, and therefore it may be more convenient to copy a stored password and paste the password in a different location. However, the user may forget that the password has been copied and may inadvertently leave the password available for future paste operations, inadvertently paste the password into an unintended area, or the like, which may provide unauthorized access or exposure to the password.

BRIEF SUMMARY

An apparatus for digital password protection is disclosed. The apparatus, in one embodiment, includes a processor and a memory that stores code executable by the processor. In certain embodiments, the memory stores code executable by the processor to monitor a volatile data storage area for data written to and read from the volatile data storage area. In further embodiments, the memory stores code executable by the processor to, in response to data being one of written to and read from the volatile data storage area, analyze the data to identify a potential password. In some embodiments, the memory stores code executable by the processor to perform one or more actions for protecting the identified potential password prior to the potential password being one of written to and read from the volatile data storage area.

A method for digital password protection includes, in one embodiment, monitoring, by a processor, a volatile data storage area for data written to and read from the volatile data storage area. The method, in some embodiments, includes, in response to data being one of written to and read from the volatile data storage area, analyzing the data to identify a potential password. The method, in various embodiments, includes performing one or more actions for protecting the identified potential password prior to the potential password being one of written to and read from the volatile data storage area.

A program product for digital password protection, in one embodiment, includes a computer readable storage medium that stores code executable by a processor. In some embodiments, the executable code includes code to perform monitoring a volatile data storage area for data written to and read from the volatile data storage area. The executable code, in certain embodiments, includes code to perform, in response to data being one of written to and read from the volatile data storage area, analyzing the data to identify a potential password. The executable code, in certain embodiments, includes code to perform performing one or more actions for protecting the identified potential password prior to the potential password being one of written to and read from the volatile data storage area.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
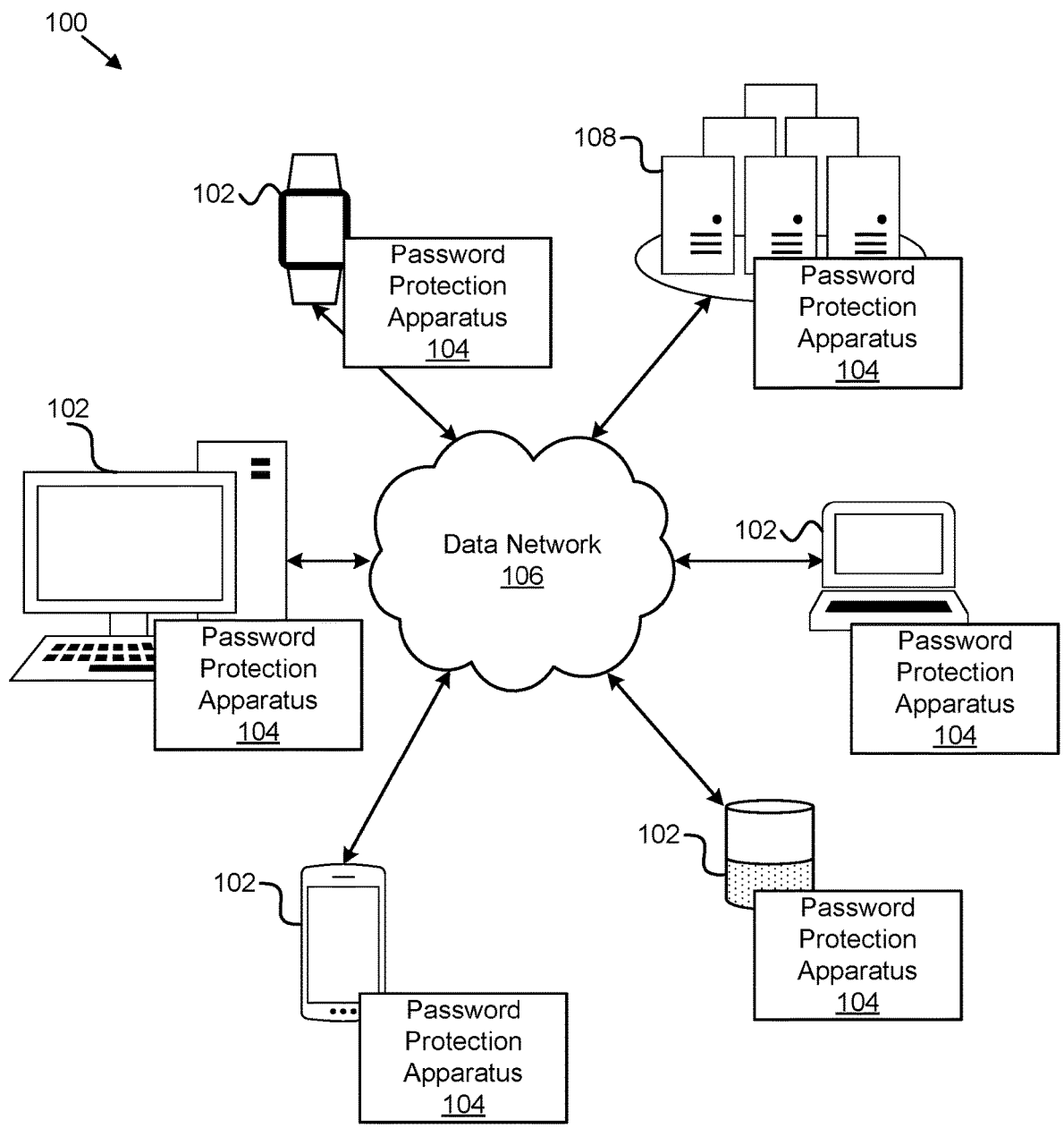
FIG. 1 is a schematic block diagram illustrating one embodiment of a system for digital password protection.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for digital password protection is disclosed. The apparatus, in one embodiment, includes a processor and a memory that stores code executable by the processor. In certain embodiments, the memory stores code executable by the processor to monitor a volatile data storage area for data written to and read from the volatile data storage area. In further embodiments, the memory stores code executable by the processor to, in response to data being one of written to and read from the volatile data storage area, analyze the data to identify a potential password. In some embodiments, the memory stores code executable by the processor to perform one or more actions for protecting the identified potential password prior to the potential password being one of written to and read from the volatile data storage area.

In one embodiment, the volatile data storage area comprises a data storage area maintained by an operating system and used for writing and reading data that is subject to a copy and paste operation. In certain embodiments, the code is further executable by the processor to detect that the potential password is being read from the volatile data storage area in response to a paste operation, prompt the user for confirmation to read the potential password from the volatile data storage area for servicing the paste operation, and perform the paste operation with the potential password in response to receiving confirmation from the user to perform the paste operation.

In one embodiment, the code is executable by the processor to detect that the potential password is being read from the volatile data storage area and copied into an unsecured field, prompt the user for confirmation to copy the potential password into the unsecured field, and copy the potential password into the unsecure field in response to receiving confirmation from the user to copy the potential password into the unsecure field.

In one embodiment, the code is executable by the processor to prompt the user for confirmation to write the potential password into the volatile data storage area in response to identifying the potential password in the data. In some embodiments, the code is executable by the processor to determine whether the data comprises text data prior to analyzing the data to identify one or more potential passwords in the data. In further embodiments, the code is executable by the processor to identify patterns within the text data that are consistent with password data. The patterns may be identified by cross-referencing the potential password with one or more of a listing of predefined passwords and one or more rules for generating passwords.

In one embodiment, the code is executable by the processor to erase the potential password from the volatile data storage area after a predetermined period of time that the potential password is stored on the volatile data storage area. In certain embodiments, the code is executable by the processor to erase the potential password from the volatile data storage area in response to the potential password being read from the volatile data storage area.

In various embodiments, the code is executable by the processor to flag at least a portion of the data that comprises the potential password while it is stored on the volatile data storage area to indicate that the data comprises a potential password. In one embodiment, the code is executable by the processor to encrypt the potential password in response to the potential password being written to the volatile data storage area and decrypt the potential password in response to the potential password being read from the volatile data storage area.

A method for digital password protection includes, in one embodiment, monitoring, by a processor, a volatile data storage area for data written to and read from the volatile data storage area. The method, in some embodiments, includes, in response to data being one of written to and read from the volatile data storage area, analyzing the data to identify a potential password. The method, in various embodiments, includes performing one or more actions for protecting the identified potential password prior to the potential password being one of written to and read from the volatile data storage area.

In one embodiment, the volatile data storage area comprises a data storage area maintained by an operating system and used for writing and reading data that is subject to a copy and paste operation. In certain embodiments, the method includes detecting that the potential password is being read from the volatile data storage area in response to a paste operation, prompting the user for confirmation to read the potential password from the volatile data storage area for servicing the paste operation, and performing the paste operation with the potential password in response to receiving confirmation from the user to perform the paste operation.

In one embodiment, the method includes detecting that the potential password is being read from the volatile data storage area and copied into an unsecured field, prompting the user for confirmation to copy the potential password into the unsecured field, and copying the potential password into the unsecure field in response to receiving confirmation from the user to copy the potential password into the unsecure field. In some embodiments, the method includes prompting the user for confirmation to write the potential password into the volatile data storage area in response to identifying the potential password in the data.

In one embodiment, the method includes determining whether the data comprises text data prior to analyzing the data to identify one or more potential passwords in the data and identifying patterns within the text data that are consistent with password data. In certain embodiments, the patterns are identified by cross-referencing the potential password with one or more of a listing of predefined passwords and one or more rules for generating passwords.

In one embodiment, the method includes erasing the potential password from the volatile data storage area after a predetermined period of time that the potential password is stored on the volatile data storage area. In some embodiments, the method includes erasing the potential password from the volatile data storage area in response to the potential password being read from the volatile data storage area.

A program product for digital password protection, in one embodiment, includes a computer readable storage medium that stores code executable by a processor. In some embodiments, the executable code includes code to perform monitoring a volatile data storage area for data written to and read from the volatile data storage area. The executable code, in certain embodiments, includes code to perform, in response to data being one of written to and read from the volatile data storage area, analyzing the data to identify a potential password. The executable code, in certain embodiments, includes code to perform performing one or more actions for protecting the identified potential password prior to the potential password being one of written to and read from the volatile data storage area.

FIG. 1 is a schematic block diagram illustrating one embodiment of a system 100 for digital password protection. In one embodiment, the system 100 includes one or more information handling devices 102, one or more password protection apparatuses 104, one or more data networks 106, and one or more servers 108. In certain embodiments, even though a specific number of information handling devices 102, password protection apparatuses 104, data networks 106, and servers 108 are depicted in FIG. 1, one of skill in the art will recognize, in light of this disclosure, that any number of information handling devices 102, password protection apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include various sensors for sensing, collecting, monitoring, or the like environmental data. The sensors may include location sensors (e.g., global positioning system ("GPS") sensors), proximity sensors, wireless signal sensors (e.g., sensors configured to sense wireless signals emitted from other devices such as Bluetooth® signals, Wi-Fi signals, near field communication ("NFC") signals, and/or the like), accelerometers, gyroscopes, light sensors, sound sensors, biometric sensors (e.g., blood pressure sensors, heart-rate monitors, fingerprint sensors, oxygen sensors, and/or the like), and/or the like.

In one embodiment, the password protection apparatus 104 is configured to monitor a volatile data storage area for data that is written to and/or read from the volatile data storage area, analyze the data to identify a potential password, and perform one or more actions for protecting the identified potential password prior to the potential password being written to or read from the volatile data storage area. The password protection apparatus 104, including its various sub-modules, may be located on one or more information handling devices 102 in the system 100, one or more servers 108, one or more network devices, and/or the like.

The password protection apparatus 104 is described in more detail below with reference to FIGS. 2 and 3.

In one embodiment, the password protection apparatus 104 improves upon conventional password protection systems by monitoring a volatile data storage area, temporary memory cache, or the like, e.g., a "clipboard", for data that may include a password, and may take various actions to prevent the potential password from being inadvertently copied to or pasted from the volatile data storage area, as described in more detail below.

In various embodiments, the password protection apparatus 104 may be embodied as a hardware appliance that can be installed or deployed on an information handling device 102, on a server 108, or elsewhere on the data network 106. In certain embodiments, the password protection apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the password protection apparatus 104 may include a power interface, a wired and/or wireless network interface, a graphical interface that attaches to a display, and/or a semiconductor integrated circuit device as described below, configured to perform the functions described herein with regard to the password protection apparatus 104.

The password protection apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the password protection apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the password protection apparatus 104.

The semiconductor integrated circuit device or other hardware appliance of the password protection apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the password protection apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. For instance, a server 108 may be an intermediary between information handling devices 102 to facilitate sending and receiving electronic messages between the information handling devices 102.

Figure 2:
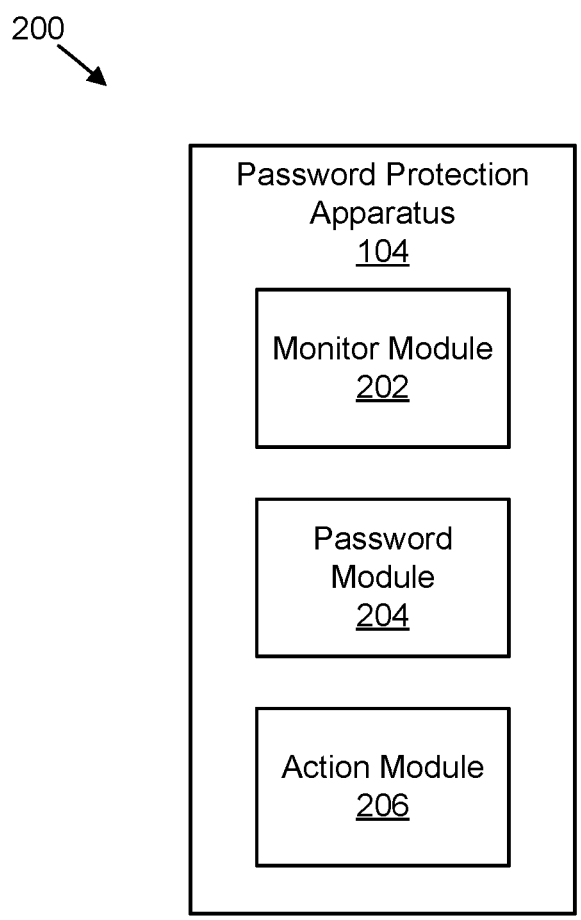
FIG. 2 is a schematic block diagram illustrating one embodiment of an apparatus for digital password protection.

FIG. 2 is a schematic block diagram illustrating one embodiment of an apparatus 200 for digital password protection. In one embodiment, the apparatus 200 includes an embodiment of a password protection apparatus 104. The password protection apparatus 104, in some embodiments, includes one or more of a monitor module 202, a password module 204, and an action module 206, which are described in more detail below.

The monitor module 202, in one embodiment, is configured to monitor a volatile data storage area for data written to and/or read from the volatile data storage area. As used herein, the volatile data storage area may be a temporary data storage area such as a random access memory area, a cache, a register, a data buffer, and/or the like. In certain embodiments, the volatile data storage area comprises a "clipboard" that is a data buffer that is maintained by an operating system and is used for short-term data storage and/or data transfer between documents or applications used by cut, copy, and paste operations.

For example, a user may copy text from one text document using a copy operation that the operating system provides, which causes the text to be copied to the clipboard and then may paste the text into the same document or into a different application using a paste operation, which causes the text to be inserted from the clipboard into the document or other application.

In certain embodiments, the clipboard is implemented as an anonymous, temporary data buffer, sometimes called the paste buffer, that can be accessed from most or all programs within the environment via application programming interfaces ("APIs"). A typical application accesses clipboard functionality by mapping user input such as key bindings, menu selections, etc. to these interfaces. The semantics of the clipboard facility varies from one operating system to another and can also vary between versions of the same system. They can sometimes be changed by different programs or by user preference.

The monitor module 202 may monitor data being copied to the volatile data storage area, accessed on the volatile data storage area, and/or read from the volatile data storage area using APIs or other interfaces, services, and/or the like. For instance, the monitor module 202 may register to receive events, signals, notifications, triggers, and/or the like when data is written to, accessed on, and/or read from the volatile data storage area comprising the clipboard.

The password module 204, in one embodiment, is configured to analyze data that is written to and/or read from the clipboard to identify a potential password in the data. The password module 204, for instance, may process data that is written to or read from the volatile data storage area to identify portions of the data that may comprise sensitive data such as passwords or other credential information, financial information (e.g., account numbers, social security numbers, etc.), and/or other personally identifying information.

The password module 204, in one embodiment, determines whether the data comprises text data prior to analyzing the data to identify the one or more potential passwords in the data. For instance, the password module 204 may distinguish text data from other types of data that is copied to the clipboard such as images, videos, audio files, URLs or other hyperlinks, GIFs, emojis, and/or the like. The password module 204 may determine the type of the data based on the application where the data was copied from (e.g., if the data was copied from Photoshop®, then there's a high likelihood that the data is image data), based on a file extension for the file that the data is copied from (e.g., a .txt file may comprise text data whereas a .jpg file comprises an image), based on the character types of the data (e.g., ASCII characters may indicate text data), based on the format or structure of the data, and/or the like.

In certain embodiments, if the password module 204 determines that the data does not include text data, then it does not perform additional processing on the data to identify a potential password within the data. Otherwise, if the password module 204 determines that the data includes text data, the password module 204 may analyze, process, or otherwise evaluate the text data to determine if the data includes data indicative of a potential password.

For instance, the password module 204 may identify patterns within the text data that are consistent with password data. The password module 204 may, for example cross-reference text data with one or more rules or guidelines for generating passwords, e.g., password strength rules that specify that the password includes an upper-case letter, a lower-case letter, a number, a symbol, no repeating characters, must be at least eight characters long, and/or the like. The rules or guidelines for generating passwords may be based on a password generation program; rules defined by the operating system, web browser, or other application; and/or other third-party web site or entity (e.g., a government agency). The password module 204 may use string searching algorithms such as regular expressions to analyze the text data for search patterns that match the predefined password rules or guidelines.

In further embodiments, the password module 204 identifies patterns within the text data that are consistent with password data by cross-referencing the text data with a listing of predefined passwords, password snippets or segments, and/or other predefined patterns that are typically found in passwords. For instance, the password module 204 may cross-reference text data with a list of the most used passwords, a list of passwords that are publicly available (e.g., from a data breach where the data was made public), a list of the user's passwords on the user's device (e.g., stored passwords for a web browser or other application, passwords that are stored as part of a password manager, e.g., LastPass®, and/or the like), and/or the like.

In one embodiment, the password module 204 flags, marks, and/or otherwise sets an indicator that at least a portion of the data that is stored in the volatile data storage area comprises the potential password so that when the data is accessed or read from the volatile data storage area, other modules can quickly determine whether the data includes a potential password and can take an action accordingly, e.g., such as prompting or notifying the user of that the potential password is being read from the volatile data storage area as described in more detail below.

The action module 206, in one embodiment, is configured to perform one or more actions for protecting the identified potential password prior to the potential password being written to and/or read from the volatile data storage area. As described in more detail below, the actions may include notifying the user that the volatile data storage area includes a potential password, presenting the potential password to the user and confirming that the potential password is an actual password; prompting the user to confirm storing and/or reading the potential password from the volatile data storage area; prompting the user for confirmation prior to pasting the potential password into an application; text field, password field, or the like; and/or the like.

In this manner, the password protection apparatus 104 can protect potential passwords that are stored in and read from the volatile data storage area as part of a copy, cut, and/or paste operation that may inadvertently be copied and/or pasted and become exposed to unauthorized users.

Figure 3:
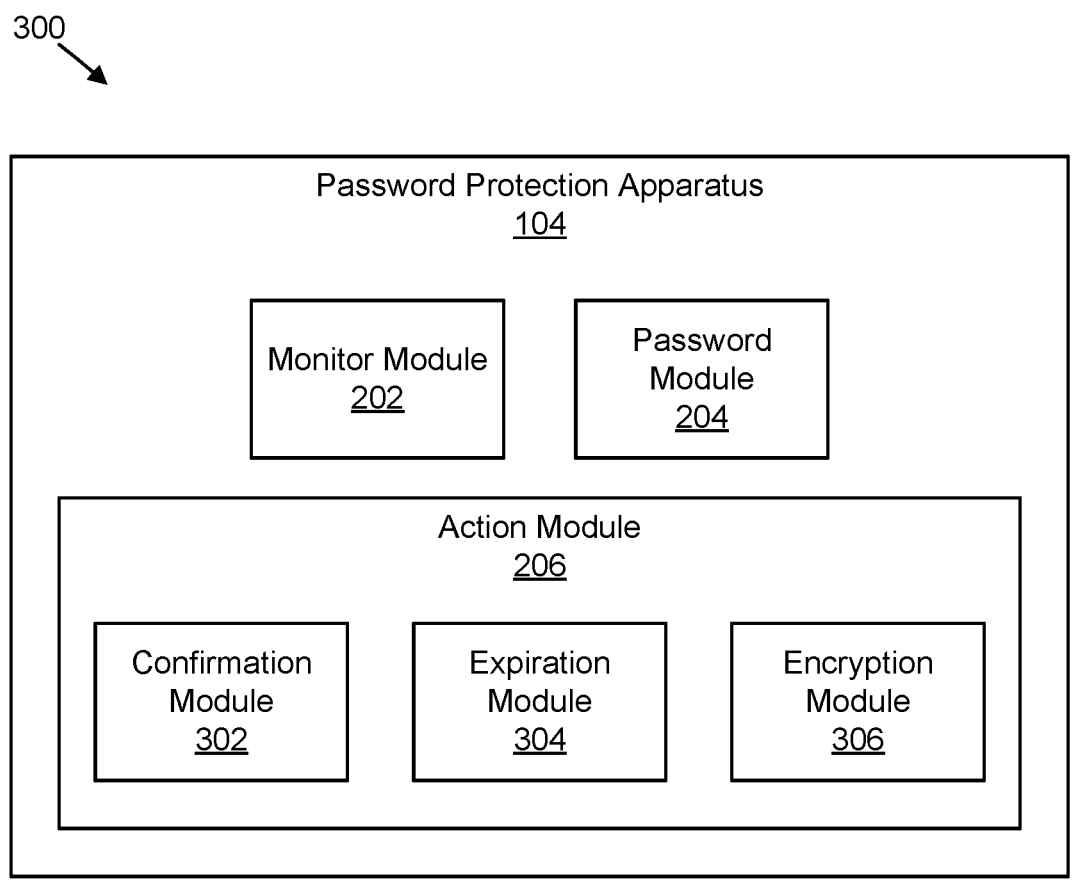
FIG. 3 is a schematic block diagram illustrating one embodiment of another apparatus for digital password protection.

FIG. 3 is a schematic block diagram illustrating one embodiment of an apparatus 300 for dynamically determining a user's availability for an activity. In one embodiment, the apparatus 300 includes an embodiment of a password protection apparatus 104. The password protection apparatus 104, in some embodiments, includes one or more of a monitor module 202, a password module 204, and an action module 206, which may be substantially similar to the monitor module 202, the password module 204, and the action module 206 described above with reference to FIG. 2. In further embodiments, the action module 206 of the password protection apparatus 104 includes one or more of a confirmation module 302, an expiration module 304, and an encryption module 306, which are described in more detail below.

In one embodiment, the confirmation module 302 is configured to prompt the user for confirmation to write and/or read/access the potential password in the volatile data storage area. For instance, the monitor module 202 may detect that a potential password is being read from the volatile data storage area in response to a paste operation, e.g., an operation to copy the potential password from the volatile data storage area into an application, web page, text field, unsecured text box or field (e.g., a text field that does not obfuscate or hide text entered into the field), and/or the like. The confirmation module 302 may prompt the user for confirmation to read the potential password from the volatile data storage area to service the paste operation.

The prompt may ask the user to confirm pasting the potential password from the volatile data storage area. The prompt may display the potential password or include an option to display the potential password so that the user can review it before responding to the prompt. If the user confirms pasting the potential password, the confirmation module 302 may perform the paste operation, or allow the paste operation to be performed with the potential password.

In further embodiments, the prompt module 302 detects that a password is has been copied, e.g., as part of a copy or cut operation, and prompts the user to confirm that the user intended to cur or copy the password. In such an embodiment, the password module 204 may analyze the copied data to determine whether the data includes text data and then whether the text data includes a potential password, as described above. The password module 302 may also determine that the copied data is password data in response to the data being copied from a secured text field or password text field, e.g., a field in a web page that is defined, designated, tagged, or the like as a password field.

In one embodiment, the expiration module 304 is configured to erase, remove, destroy, overwrite, delete, mark as deleted, or the like the potential password from the volatile data storage area after a predetermined period of time that the potential password is stored on the volatile data storage area. For example, the expiration module 304 may store a timestamp for each potential password that is stored in the volatile data storage area that indicates when the potential password was stored in the volatile data storage area. The expiration module 304 may periodically check the timestamps to determine whether the potential passwords have been in the volatile data storage area longer than the predetermined period of time, e.g., one minute, five minutes, a half hour, an hour, a day, or the like. If so, the expiration module 304 may erase, remove, destroy, overwrite, delete, mark as deleted, or the like the potential password from the volatile data storage area.

In some embodiments, the expiration module 304 is configured to erase, remove, destroy, overwrite, delete, mark as deleted, or the like the potential password from the volatile data storage area in response to the potential password being accessed or read from the volatile data storage area. For example, after the potential password is read from the volatile data storage area to service a paste operation, the expiration module 304 may delete the potential password from the volatile data storage area so that it cannot be accessed again. In this manner, the potential password can be used one time from the volatile data storage area to prevent inadvertent accesses, reads, uses, or the like of the potential password from the volatile data storage area.

In one embodiment, the encryption module 306 is configured to encrypt the potential password in response to the potential password being written to the volatile data storage area and decrypt the potential password in response to the potential password being read from the volatile data storage area. For example, the encryption module 306 may encrypt all data that is written to the volatile data storage area or only data that includes a potential password. The encryption module 306 may use a different encryption key, algorithm, scheme, or the like for each data that is stored on the volatile data storage area, and may store the encryption details, e.g., the key, algorithm, etc., as metadata associated with the encrypted data so that the data can be decrypted when it is read from the volatile data storage area.

Figure 4:
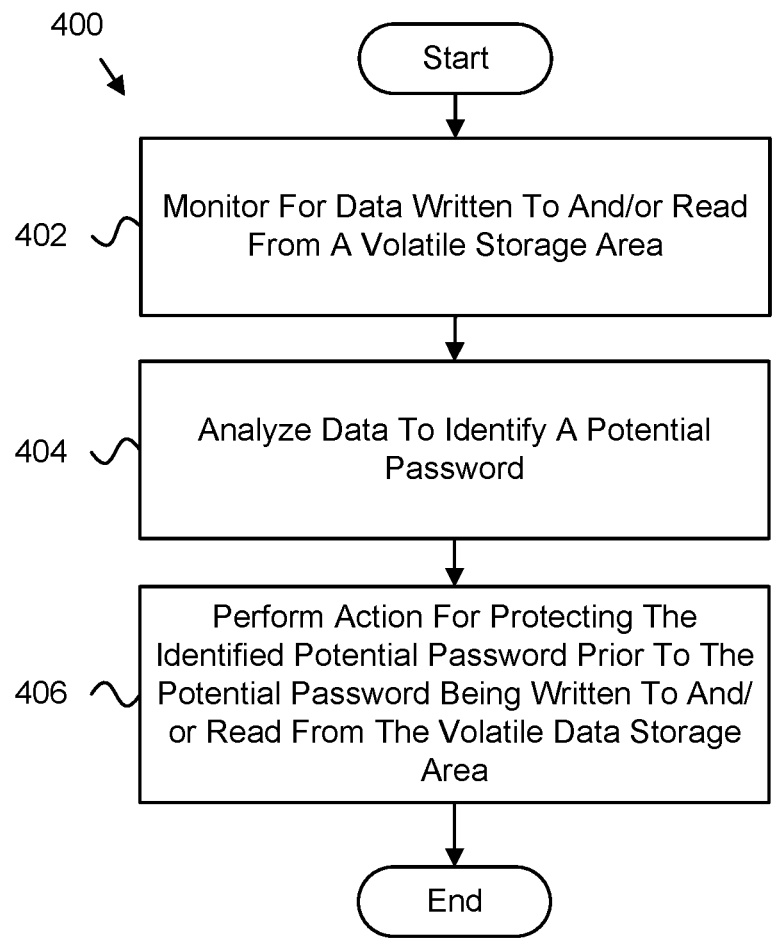
FIG. 4 is a schematic flow chart diagram illustrating one embodiment of a method for digital password protection.

FIG. 4 is a schematic flow chart diagram illustrating one embodiment of a method 400 for digital password protection. In one embodiment, the method 400 begins and monitors 402 a volatile data storage area for data written to and read from the volatile data storage area. The method 400, in certain embodiments, analyzes 404 the data to identify a potential password in response to data being one of written to and read from the volatile data storage area. In some embodiments, the method 400 performs 406 one or more actions for protecting the identified potential password prior to the potential password being one of written to and read from the volatile data storage area, and the method 400 ends. In various embodiments, the monitor module 202, the password module 204, and the action module 206 perform the various steps of the method 400.

Figure 5:
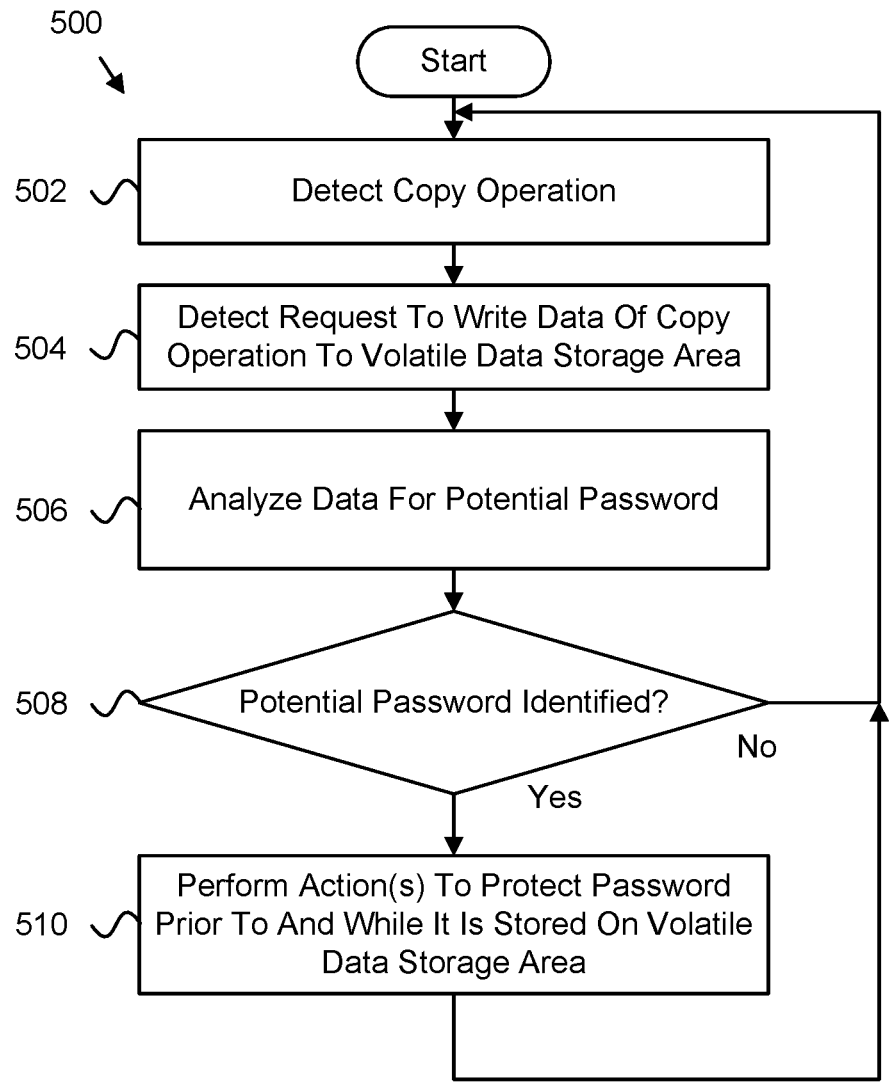
FIG. 5 is a schematic flow chart diagram illustrating one embodiment of another method for digital password protection.

FIG. 5 is a schematic flow chart diagram illustrating one embodiment of another method 500 for digital password protection. In one embodiment, the method 500 begins and detects 502 a copy operation (e.g., detects a copy command, a cut command, or the like) for certain data and detects 504 a request to write data of the copy operation to a volatile data storage area. The method 500, in certain embodiments, analyzes 506 the data to identify a potential password in response to data being written to the volatile data storage area.

In further embodiments, the method 500 determines 508 whether the copied data includes a potential password. If not, the method 500 continues to detect 502 copy operations. Otherwise, the method 500 performs 510 one or more actions to protect the potential password prior to and while it is stored on the volatile data storage area such as prompting the user to confirm copying the potential password, encrypting the potential password while it is stored on the volatile data storage area, or the like, and the method 500 continues to detect 502 copy operations. In various embodiments, the monitor module 202, the password module 204, and the action module 206 perform the various steps of the method 500.

Figure 6:
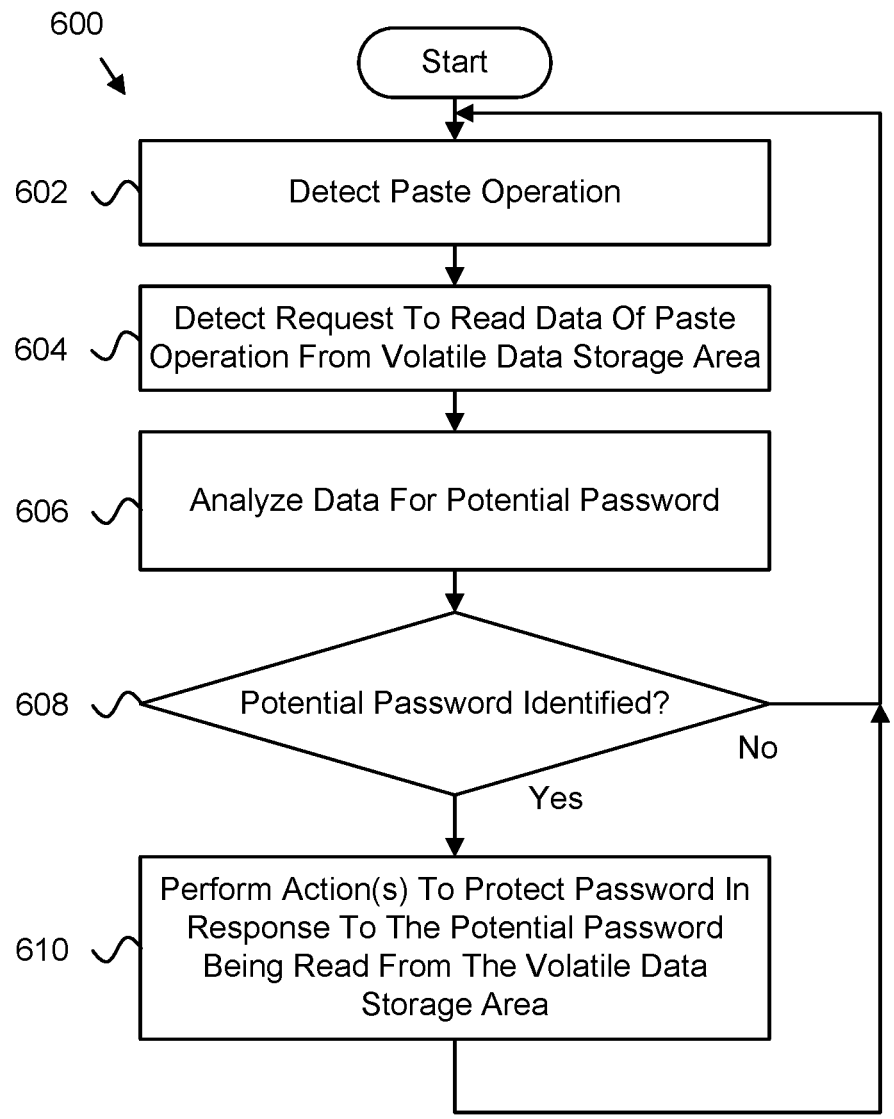
FIG. 6 is a schematic flow chart diagram illustrating one embodiment of yet another method for digital password protection.

FIG. 6 is a schematic flow chart diagram illustrating one embodiment of another method 600 for digital password protection. In one embodiment, the method 600 begins and detects 602 a paste operation (e.g., detects a paste command) for data stored on the volatile data storage area and detects 604 a request to read data of the paste operation from the volatile data storage area. The method 600, in certain embodiments, analyzes 606 the data to identify a potential password in response to data being read from the volatile data storage area (e.g., the data may be analyzed for a potential password when it is accessed or read from the volatile data storage area, or a flag or other indicator may be checked that indicates whether the data includes a potential password).

In further embodiments, the method 600 determines 608 whether the read data includes a potential password. If not, the method 600 continues to detect 602 paste operations. Otherwise, the method 600 performs 610 one or more actions to protect the potential password that is read from the volatile data storage area such as prompting the user to confirm pasting the potential password, or the like, and the method 600 continues to detect 602 paste operations. In various embodiments, the monitor module 202, the password module 204, and the action module 206 perform the various steps of the method 600.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus, comprising:
    a processor;
    a memory that stores code executable by the processor to:
        monitor a volatile data storage area for data read from the volatile data storage area;
        in response to data being read from the volatile data storage area and in response to the data comprising text data, directly analyze content of the data to identify a potential password within the data content that is read from the volatile data storage area by identifying patterns within the text data that are consistent with password data, the patterns identified by cross-referencing the potential password with one or more of a listing of predefined passwords and one or more rules for generating passwords;
        detect that the potential password is being read from the volatile data storage area and copied into an unsecure field;
        perform one or more actions for protecting the potential password prior to the potential password being read from the volatile data storage area, the one or more actions comprising prompting the user for confirmation to copy the potential password into the unsecure field; and
        copy the potential password into the unsecure field in response to receiving confirmation from the user to copy the potential password into the unsecure field.

2. The apparatus of claim 1, wherein the volatile data storage area comprises a data storage area maintained by an operating system and used for writing and reading data that is subject to a copy and paste operation.

3. The apparatus of claim 1, wherein the code is executable by the processor to:
    detect that the potential password is being read from the volatile data storage area in response to a paste operation;
    prompt the user for confirmation to read the potential password from the volatile data storage area for servicing the paste operation; and perform the paste operation with the potential password in response to receiving confirmation from the user to perform the paste operation.

4. The apparatus of claim 1, wherein the code is executable by the processor to prompt the user for confirmation to write the potential password into the volatile data storage area in response to identifying the potential password in the data.

5. The apparatus of claim 1, wherein the code is executable by the processor to erase the potential password from the volatile data storage area after a predetermined period of time that the potential password is stored on the volatile data storage area.

6. The apparatus of claim 1, wherein the code is executable by the processor to erase the potential password from the volatile data storage area in response to the potential password being read from the volatile data storage area.

7. The apparatus of claim 1, wherein the code is executable by the processor to flag at least a portion of the data that comprises the potential password while it is stored on the volatile data storage area to indicate that the data comprises a potential password.

8. The apparatus of claim 1, wherein the code is executable by the processor to encrypt the potential password in response to the potential password being written to the volatile data storage area and decrypt the potential password in response to the potential password being read from the volatile data storage area.

9. A method, comprising:
monitoring, by a processor, a volatile data storage area for data read from the volatile data storage area;
in response to data being read from the volatile data storage area and in response to the data comprising text data, directly analyzing content of the data to identify a potential password within the data content that is read from the volatile data storage area by identifying patterns within the text data that are consistent with password data, the patterns identified by cross-referencing the potential password with one or more of a listing of predefined passwords and one or more rules for generating passwords;
detecting that the potential password is being read from the volatile data storage area and copied into an unsecure field;
performing one or more actions for protecting the potential password prior to the potential password being read from the volatile data storage area, the one or more actions comprising prompting the user for confirmation to copy the potential password into the unsecure field; and
copying the potential password into the unsecure field in response to receiving confirmation from the user to copy the potential password into the unsecure field.

10. The method of claim 9, wherein the volatile data storage area comprises a data storage area maintained by an operating system and used for writing and reading data that is subject to a copy and paste operation.

11. The method of claim 9, further comprising:
detecting that the potential password is being read from the volatile data storage area in response to a paste operation;
prompting the user for confirmation to read the potential password from the volatile data storage area for servicing the paste operation; and
performing the paste operation with the potential password in response to receiving confirmation from the user to perform the paste operation.

12. The method of claim 9, further comprising prompting the user for confirmation to write the potential password into the volatile data storage area in response to identifying the potential password in the data.

13. The method of claim 9, further comprise erasing the potential password from the volatile data storage area after a predetermined period of time that the potential password is stored on the volatile data storage area.

14. The method of claim 9, further comprising erasing the potential password from the volatile data storage area in response to the potential password being read from the volatile data storage area.

15. A program product comprising a non-transitory computer readable storage medium that stores code executable by a processor, the executable code comprising code to perform:
monitoring a volatile data storage area for data read from the volatile data storage area;
in response to data being read from the volatile data storage area and in response to the data comprising text data, directly analyzing content of the data to identify a potential password within the data content that is read from the volatile data storage area by identifying patterns within the text data that are consistent with password data, the patterns identified by cross-referencing the potential password with one or more of a listing of predefined passwords and one or more rules for generating passwords;
detecting that the potential password is being read from the volatile data storage area and copied into an unsecure field;
performing one or more actions for protecting the potential password prior to the potential password being read from the volatile data storage area, the one or more actions comprising prompting the user for confirmation to copy the potential password into the unsecure field; and
copying the potential password into the unsecure field in response to receiving confirmation from the user to copy the potential password into the unsecure field.

\* \* \* \* \*